(12) United States Patent
Hucker et al.

(10) Patent No.: US 9,831,045 B2
(45) Date of Patent: Nov. 28, 2017

(54) STRUCTURAL SUPERCAPACITOR USABLE IN A MECHANICAL STRUCTURE

(71) Applicant: BAE SYSTEMS PLC, London (GB)

(72) Inventors: Martyn John Hucker, Filton (GB); Michael Dunleavy, Filton (GB); Sajad Haq, Filton (GB)

(73) Assignee: BAE SYSTEMS PLC, London (GB)

( * ) Notice: Subject to any disclaimer, the term of this patent is extended or adjusted under 35 U.S.C. 154(b) by 94 days.

(21) Appl. No.: 14/418,995

(22) PCT Filed: Jul. 31, 2013

(86) PCT No.: PCT/GB2013/052049
§ 371 (c)(1),
(2) Date: Feb. 2, 2015

(87) PCT Pub. No.: WO2014/020338
PCT Pub. Date: Feb. 6, 2014

(65) Prior Publication Data
US 2015/0162140 A1    Jun. 11, 2015

(30) Foreign Application Priority Data
Aug. 3, 2012    (GB) .................... 1213803.8

(51) Int. Cl.
*H01G 11/52*    (2013.01)
*H01G 11/36*    (2013.01)
(Continued)

(52) U.S. Cl.
CPC .............. *H01G 11/52* (2013.01); *B32B 37/24* (2013.01); *H01G 11/36* (2013.01); *H01G 11/38* (2013.01);
(Continued)

(58) Field of Classification Search
CPC .......... H01G 11/86; H01G 9/26; H01G 11/70; H01G 9/042; H01G 11/58; H01G 11/68; H01G 9/028; H01G 9/155
See application file for complete search history.

(56) References Cited

U.S. PATENT DOCUMENTS

| | | | | |
|---|---|---|---|---|
| 2,978,529 A | * | 4/1961 | Brisley | ............... H01M 2/1613 116/4 |
| 4,217,401 A | * | 8/1980 | Pellegri | ................... C25B 11/02 204/266 |

(Continued)

FOREIGN PATENT DOCUMENTS

WO    2007072993 A1    6/2007

OTHER PUBLICATIONS

GB Search Report dated Nov. 29, 2012 of Patent Application No. GB1213803.8 filed Aug. 3, 2012, 4 pages.

(Continued)

*Primary Examiner* — Dion R Ferguson
(74) *Attorney, Agent, or Firm* — Maine Cernota & Rardin

(57) ABSTRACT

According to the invention there is provided a component including a supercapacitor and a method of producing same. The component comprises a first (12) and second (14) electrode and a separator structure (16) which separates the two electrodes and contains a liquid or gel electrolyte. The first and second electrode structures are each formed from a composite material (10) which includes electrically conductive fibers and electrochemically active material in a binder matrix and the supercapacitor is formed to be structurally inseparable from the rest of the component. Further, the component forms a structural capacitor. The obtained structural capacitor could be used in aircraft structure to save weight.

15 Claims, 1 Drawing Sheet

Figure 1:
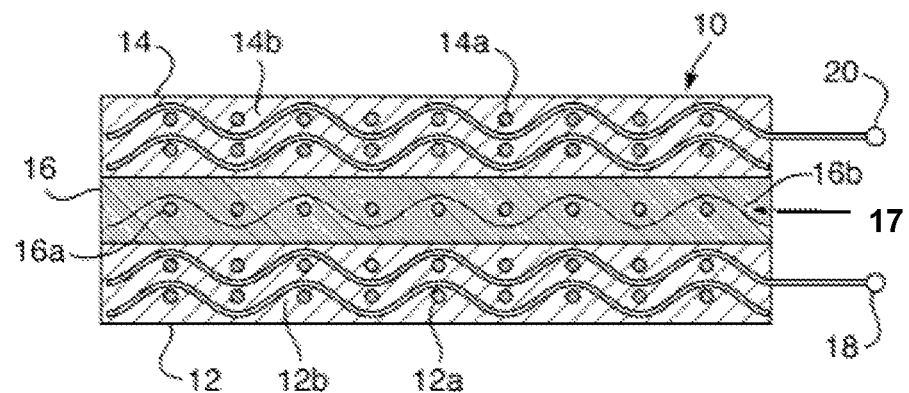

(51) Int. Cl.
- *H01G 11/40* (2013.01)
- *H01G 11/58* (2013.01)
- *B32B 37/24* (2006.01)
- *H01G 11/38* (2013.01)
- *H01G 13/04* (2006.01)

(52) U.S. Cl.
CPC ............ *H01G 11/40* (2013.01); *H01G 11/58* (2013.01); *H01G 13/04* (2013.01); *B32B 2457/16* (2013.01); *Y02B 10/30* (2013.01); *Y02E 60/13* (2013.01); *Y02T 10/7022* (2013.01); *Y10T 29/417* (2015.01); *Y10T 156/10* (2015.01)

(56) References Cited

U.S. PATENT DOCUMENTS

| | | |
|---|---|---|
| 5,793,603 A | 8/1998 | Lyman |
| 6,320,740 B1* | 11/2001 | Saito ................ H01G 9/155 29/25.03 |
| 6,433,996 B1* | 8/2002 | Hata ................ C08G 18/285 29/25.03 |
| 6,981,671 B1* | 1/2006 | Baron ................ B64D 27/24 244/1 A |
| 7,864,505 B1 | 1/2011 | O'Brien |
| 2003/0169558 A1 | 9/2003 | Olson et al. |
| 2010/0259866 A1 | 10/2010 | Shaffer et al. |
| 2010/0296226 A1 | 11/2010 | Nanba et al. |
| 2011/0051320 A1 | 3/2011 | Miller |
| 2011/0149465 A1 | 6/2011 | Hashimoto et al. |
| 2011/0164349 A1 | 7/2011 | Snyder et al. |
| 2011/0304964 A1 | 12/2011 | Fleischer et al. |
| 2012/0044614 A1* | 2/2012 | Hommo ................ H01G 11/58 361/502 |
| 2012/0154979 A1 | 6/2012 | Signorelli et al. |
| 2013/0083452 A1* | 4/2013 | Chiu ................ H01G 11/36 361/502 |
| 2015/0093629 A1* | 4/2015 | Sayre ................ H01M 2/0262 429/156 |

OTHER PUBLICATIONS

PCT Search Report dated Oct. 11, 2013 of Patent Application No. PCT/GB2013/052049 filed Jul. 31, 2013, pages.

\* cited by examiner

STRUCTURAL SUPERCAPACITOR USABLE IN A MECHANICAL STRUCTURE

RELATED APPLICATIONS

This application is a US National Phase Application filed under 35 USC 371 of PCT Application No. PCT/GB2013/052049, filed 31 Jul. 2013, which claims the benefit of GB Application No. GB1213803.8, filed 3 Aug. 2012. Each of these applications is herein incorporated by reference in their entirety for all purposes.

This invention relates to structural supercapacitors, more specifically to structural supercapacitors that may replace structural components based on composite materials.

According to a first aspect of the invention there is provided a component including a structural supercapacitor, the structural supercapacitor comprising a first electrode structure, a second electrode structure and a separator structure, said separator structure formed from at least one ply of a non-conducting fibre, which separates the first electrode from the second electrode, said separator structure further comprising a fluidic electrolyte, wherein the first electrode and the second electrode are each formed from at least one ply of conductive composite material which includes electrically conductive fibres in a binder matrix and wherein the capacitor is structurally inseparable from the rest of the component.

In a highly preferred arrangement the fluidic electrolyte is a liquid electrolyte. In a highly preferred arrangement there is at least one void within the structural supercapacitor which may be filled with the liquid electrolyte. Preferably the separator structure comprises at least one region which contains no binder mixture, to accommodate said liquid electrolyte.

The at least one void may be formed by partially bonding the separator structure to the first electrode and/or the second electrode structure to provide interstices, to accommodate the aqueous electrolyte. Alternatively, a porous additive may be used to provide a more open cell structure having channels for the electrolyte to promote circulation of the electrolyte around the electrically active materials of the first and second electrodes.

In a preferred arrangement the first electrode and/or second electrode may each comprise and are electrically connected to at least one electrically conductive fibre ply, such that the area of the first and or second electrodes may be increased. The first and second electrodes may have a portion of their resin removed so as to allow direct electrical contact, The at least one void may be formed by the inclusion of an open cell foam, which may comprise the liquid electrolyte.

One of the advantages of a structural supercapacitor is the use as a direct replacement for a panel on a body, such as a structure, vehicle, vessel or craft.

The component, namely the super capacitor itself, is structurally rigid. It has been found that the use of separator structure which is formed from non-conducting plys, which are electrically insulative and allow the conduction of ions, such as for example woven fibres that are routinely used in the preparation of fibre reinforced polymers, when cured provides the required degree of structural rigidity to the final panel. The separator structure preferably is formed from a composite material which includes electrically insulating fibres in a binder matrix, The electrically insulating fibres may be glass, polymer, ceramic or textile fibres, and may be selected depending on the desired mechanical or physical properties of the component. Examples of suitable electrically insulating fibres include E-glass, S2-glass, silica, and silicon carbide fibres. Examples of textile fibres include natural fibres such as cotton, and synthetic fibres which are typically polymer fibres such as Nylon®, UHMWPE, aramids, polypropylene, PTFE and polyester. Thus it is possible to provide a component comprising a structural supercapacitor, in which fibre reinforced cell components provide a dual role by functioning as active electrical elements and also as structural features of the component, being integral therewith. The capacitor may thus be entirely free of any border or barrier between the capacitor or its electrodes and any part of the component which does not act as part of the capacitor. Thus, parts of the component which are not part of the capacitor may simply comprise composite material where the fibres or matrix are not electrically conductive.

The separator structure may include separator materials such as microporous polymer films, which may be used in combination with electrically insulating fibres in a binder matrix to aid ion transport. The additional use of conventional electrode separator structure material may provide enhanced levels of capacitance of the final device, however there may be a reduction in the structural rigidity of the final panel.

A structural capacitor is intended as a direct structural replacement for an existing panel on a vehicle vessel or craft, and if further energy storage is required, further non-energy storage panels may be replaced with structural supercapacitor panels according to the invention.

Conventional capacitors are typically present on integrated circuit boards and require additional support structures, such as casing, packaging, separators, electrodes, current collectors and the like. These, from a component operational point of view, are wholly parasitic. The present inventors have recognised that these additional support structures reduce the volumetric and/or gravimetric efficiency of conventional supercapacitors. In the present invention, active electrical components are multi-functional since they also perform a structural role as, for example, load bearing, protective or otherwise physically robust elements of the component.

The first and second electrodes may be selected from any conducting ply material, preferably carbon cloth. In a highly preferred arrangement the carbon may be coated with carbon nanotubes which are known to increase the ion mobility around composite electrodes.

In a further embodiment, one or more of the first and second electrodes and the separator structure may contain a porous additive (i.e. a porogen) which increases access of the electrolyte into said structure. The porous additive may be one or more of silica, silica gel or carbon powder.

At least one of the first and second electrodes may further include an electrically conductive additive such as carbon powder. It will be apparent to the skilled reader that carbon powder can perform a dual role as a porous additive and an electrically conductive additive.

The thickness of the first and second electrodes and/or the separator structure may be conveniently varied in order to provide desired mechanical and electrical properties. These structures may be formed from one or more layers. Variation of the number of layers is one way in which the thickness of these structures may be varied.

Alternatively, the fluidic electrolyte may be a gel.

According to a further aspect of the invention there is provided a panel on a vehicle vessel or craft comprising at least one component according to the invention.

The use of carbon fibre plys provides will enable components of the invention to be used where they are required to be strong and light such as in structural applications for aircraft or satellites. A particular application is seen as providing both structure and power in unmanned aerial vehicles which are often required to stay in flight for long periods, for example when carrying out surveillance operations, and where a source of power which does not add significantly to the weight of the aircraft will enable the aircraft to stay in flight for longer than if conventional power storage devices were used. Structural capacitors used in this way will work well with solar cells, positioned say on the aircraft wings, which can be used to re-charge the devices in flight. Components according to the invention, may be used for example as wing skins, can be used to provide power for structural health monitoring of the aircraft when in flight. The availability of such power, with low additional weight, may enable longer flights to be planned in the knowledge that any aircraft health issues which arise are likely to be notified early and may be provided with more sophistication that was previously possible because more monitoring systems can be provided for the same weight, when compared with conventional batteries. Thus, more accurate decision making about the flightworthiness of the aircraft is likely to lead to greater mission availability. The structural supercapacitors may be used in conjunction with structural or conventional batteries as they are capable of taking a large amount of energy, and hence may be used to recharge structural batteries or conventional batteries.

The electrically conductive fibres of the first and second electrodes may include fibres having a conductive coating. The fibres having a conductive coating may include carbon fibres and/or electrically insulating fibres with a conductive coating.

Preferably, where the electrically conductive fibres of the first and second electrodes include fibres having a conductive coating, these fibres are metallised fibres, such as nickel coated fibres. However, other conductive coatings may be used.

The electrically conductive fibres of the first and second electrodes may be in the form of a woven fabric or may be non woven, for example in uni-directional plies or as a non-crimp fabric.

The structural capacitor may include a plurality of supercapacitor units which may be interdigitated, multilayered or spatially distributed within the component or article. For example, an aircraft composite wing skin incorporating supercapacitors, according to the invention, may have the devices distributed across a large area of wing, either because the cells are connectable to solar cells distributed on the wing skin or because the devices are connectible to distributed power users such as lights, flight control surfaces, valves or sensors for aircraft systems, etc., located in different parts of the wing.

According to a second aspect of the invention there is provided a method of manufacturing a component including, and being structurally inseparable from, a supercapacitor including an first and second electrode comprising fibrous reinforcing material and plastics matrix material and a separator structure, the separator structure separating the first from the second electrode and comprising at least one void to accommodate a liquid electrolyte; the method including the steps of laying up, either side of the separator structure, a layup of plies of electrically conductive fibrous reinforcing material for the first and second electrodes, introducing a binder matrix, into at least the first and second electrodes and consolidating the layup of first electrode, second electrode and separator structure into a single composite component.

A composite component according to the invention may conveniently be made by any known composite manufacturing processes compatible with the cell chemistry concerned. For example, wet layup; pre-pregging; resin infusion or resin transfer moulding or vacuum assisted resin transfer moulding may all be used. Use of such well known techniques allows great flexibility in form and size of batteries incorporated into components made according to the invention. One advantage of using these commonly used techniques is that components of the invention may be employed to replace already existing parts made by the same techniques but not having the advantage of a supercapacitor formed integral therewith.

Components according to the invention may be used in new designs or to replace worn, damaged or outdated parts of any items which can be manufactured of composite material. For example, vehicles, whether land, air, space or water born, may have parts manufactured with integral supercapacitors, according to the invention. Examples of such use may include wing skins on aircraft, and in particular unmanned air vehicles, where components according to the invention may be used to power structural monitoring equipment, control surfaces, cameras, lights etc. Where the component may be exposed to sunlight or be otherwise connectible to photovoltaic equipment, the supercapacitors may be charged using such equipment. Owing to the ability of supercapacitors in composite components according to the invention to be positioned anywhere in the component, where the component is a wing skin the photovoltaic cells may be positioned adjacent to the supercapacitors of the invention to avoid unnecessary wiring. Conveniently, where the component is used to replace a panel on an existing body, vehicle, vessel or craft, the component may preferably be engineered to the same dimensions as the original panel.

Further potential uses on vehicles may include body panels on hybrid or electric drive vehicles where the components of the invention can be used to save weight and bulk, compared to conventional energy sources. Such components may also find use on free flooding hydrodynamic hulls of, say, submersible remotely operated vehicles. The components would be especially useful on any vehicle where weight or bulk was at a premium like an aircraft or a satellite. On a satellite the saving in space and bulk of components according to the invention which could be used to power various systems would potentially be of great benefit and would likely increase the payload capability of the satellite substantially.

In buildings, components according to the invention may comprise wall panels in portable or temporary buildings, room dividers, suspended ceiling panels, doors or window frames. In all these items the electrical power available from the supercapacitor would replace or reduce the need for wiring and, once again, could be used in conjunction with photovoltaic equipment to generate the power held in the supercapacitors of the components according to the invention.

A further advantage of using devices incorporated into such components is that the mass of the supercapacitors, where desired, may be distributed integrally throughout the various components. This can be very beneficial, for example, when sudden shocks occur to the component. Such shocks might occur, for example, for vehicles involved in collisions. For military or, say, nuclear containment equipment, explosions or projectile impacts may cause such shocks. Under such conditions the integral nature of the supercapacitors in the components of which they form part will prevent their tending to act as uncontained missiles. Conventional supercapacitors or capacitors, when used in military tanks or armoured carriers for example, will be liable to act as uncontained missiles during an explosion or under projectile impact. However, supercapacitors integral with the components according to the invention, because of the inherent support provided by the structure of the component, will not form separate detached objects and will avoid this problem.

An example of a component according to the invention in which structural supercapacitors are evenly distributed is internal panelling for a vehicle which may be in the form of a spall liner, as used in military vehicles. These vehicles are often used for reconnaissance patrols during which they spend a considerable time with their engines switched off on 'silent watch'. In these circumstances the supercapacitors may be used to provide power for sensors, communications, life support, air conditioning, etc. and there must be enough residual power to restart the vehicle engine. The spall liners will form part of the vehicle armour but will also provide additional power without taking up any further limited internal space and will not add further weight or bulk to the vehicle. The extra weight of additional conventional batteries or capacitors would normally reduce manoeuvrability and speed of the vehicle. Components according to the invention may also comprise external vehicle armour as this is often manufactured from composite material.

The distributed nature of the supercapacitors in the components also has the advantage of easing the design of an aircraft for the correct weight distribution. There is no parasitic mass which has to be positioned wherever space is available on the aircraft and which forms a concentrated mass which must be balanced in order to trim the aircraft and which must be wired to equipment to be powered and also to a power source. The weight of supports and packaging for the supercapacitors will also be avoided as they will be integral with the aircraft itself. They may be positioned closer to equipment to be powered as they form part of the aircraft structure and do not need separate accommodation.

Of potential great importance would be the use of components according to the invention in electrical or electronic equipment, in particular portable equipment such as computers, personal digital assistants (PDAs), cameras and telephones. Here mountings for such equipment such as circuit boards, casings and the like could be made according to the invention which would, again, assist in cutting down the weight and bulk of such items enabling them to be lighter, smaller and possibly cheaper, owing to the reduced part count. Alternatively, for equipment carried on the user's person such as cameras, PDAs and mobile phones, the power source for such equipment could be comprised in items of clothing to be worn by the user. In addition, the perennial problem of heat dissipation in portable equipment powered by batteries could be alleviated by incorporating the supercapacitors in, for example, the casing of a portable computer where they could dissipate heat much more easily with the possible avoidance of the need for cooling fans.

For energy capture, components such as wind turbine casings or blades and solar array support structures could be made according to the invention to cut down on wiring or on weight and bulk.

When building structures are fabricated from such components they may in addition be provided with solar panels, or other energy generation means, so as to provide a readily portable structure comprising both energy generation and energy storage means.

The below experimental provides example 1, which is the prior art, solid polymer electrode technology. Example 2 provides experimental details for devices according to the invention.

Example 1) Solid Polymer Electrolyte (SPE) Construction (Prior Art Technology)

Li triflate (lithium-trifluoromethane sulfonate) 1.6 g was dissolved in polyethyleneglycol diglycidyl ether (PEGDE) 40 g. The mixture was heated to ~60° C. to dissolve the Li salts. Triethyinetetramine (TETA, Struer's hardener) was used to crosslink the PEGDE/Li mixture.

Samples with ratios of 4:1 and 25:3 PEGDE-Li/TETA were prepared and cured overnight at room temperature in closed containers. The samples were rubbery but the 4:1 mixture was noted to be somewhat softer.

Construction

Two separate capacitors were prepared using standard 200 gsm plain weave carbon fibre (CF) cloths. Single layers of carbon fibre (CF) fabric approximately 80 mm×80 mm were used for electrodes. Four layers of e-glass fibre (EG) cloth approximately 120×120 mm were used in between the electrodes as a separator. The glass fabric was made much larger than the carbon to ensure no short circuits were possible around the perimeter of the capacitors due to stray carbon fibres. The dry fabric stacks were infiltrated with pre-mixed electrolyte mixtures using a pipette. One stack was infiltrated with a 4:1 (PEGDE-Li:ETA) mix [HF3321] and one with a 25:3 (PEGDE-Li:TETA) mix [HF3322]. Both stacks were vacuum bagged and cured overnight at room temperature.

Capacitance Tests

The samples were tested with a Fluke 287 digital volt meter (DVM) to check for correct operation. To provide stable electrical contact with the carbon fibre electrodes an area ~10×10 mm at the centre of each face was lightly abraded and a nickel mesh contact was bonded on using conductive epoxy. The samples were then post-cured at 70° C. for 2 hours. Capacitance measurements were taken using the DVM and are shown in Table 1.

TABLE 1

| Initial capacitances after post cure. | |
|---|---|
| Sample | Capacitance µF |
| Plain 4:1 | 115 |
| Plain 25:3 | 120 |

Charging Rate Effects

All electrochemical double layer capacitors (EDLC) experience a time dependant effect known as 'dielectric absorption' whereby the charge/discharge time can influence the apparent capacitance of the device. Unlike conventional electrostatic capacitors energy is stored in supercapacitors via formation of an electrochemical double layer through motion of mobile ions in the electrolyte. Depending on the mobility of ions in the electrolyte it can take a significant amount of time for the dielectric to become fully polarised when an electric field is applied. Likewise, on discharge the rate at which stored energy can be released is limited. Dielectric absorption therefore represents a dynamic component of the internal resistance of EDLC devices and needs to be figured in when considering how to use them. The effects of dielectric absorption means that all EDLC based supercapacitors are essentially DC devices. It is known that supercapacitors show diminishing capacitance with test signal frequency Tests were conducted with a SPE based device to investigate this effect over a range of charging rates under DC conditions. The device was charged to 2V via a current limiting resistor and the charging behaviour was monitored by logging the capacitor's voltage over time. It is normally possible to estimate the capacitance of an ideal capacitor from the time constant of the circuit. The product of resistance (R) and capacitance (C) represents the time taken to charge to 63.2% ($1-e^{-1}$) of the applied voltage. Resistances of 100 k ohm, 31 k ohm and 1 k ohm were selected to provide a range of charging current limits. Charging times at 100 k and 31 k ohms were very long and the tests were terminated after around 30 minutes. The capacitor was short circuited for 30 mins prior to each run as residual charge due to dielectric absorption can lead to large errors in the apparent capacitance. The data for the runs were plotted and curve fitted (Ln) to allow estimation of the time to charge to 63.2% and by making this assumption it was possible to estimate the 'apparent' capacitance. The results are given in Table 4 and show that extreme care must be exercised when determining the practical capacitance of these devices. Long time-constant dielectric absorption is associated with low ion mobility which is in turn a notable characteristic of current SPE materials. It is possible to increase the ion mobility of SPEs by reducing the density of crosslinks in the polymer. However, a low density of cross links has a detrimental effect on the mechanical properties of the SPE making it much less suitable as a matrix for structural composite materials.

TABLE 4

Variation in 'apparent' capacitance with rate of charge due to long time constant dielectric absorption in solid polymer electrolyte

| Resistance | Apparent capacitance |
|---|---|
| 100k ohm | ~4800 F |
| 31k ohm | ~50 F |
| 1k ohm | ~0.002 F (2 mF) |

Example 2) Liquid Electrolyte Filled Devices

The above experimental information for SPE type supercapacitors suggests there is a trade-off between electrical and mechanical performance. It appears that current SPE materials are not well suited to multifunctional applications. The invention has provided an improved alternative to SPEs for structural composite EDLC devices (supercapacitors) that provides a combination of both good electrical and mechanical properties.

Construction

Two sections of carbon fibre CFRP material were bonded either side of a glass fibre fabric separator structure using a viscosity modified resin, preferably a viscosity modified epoxy resin system to create selectively infiltrated and non-infiltrated areas in the glass fibre fabric. This provides structures with only a small reduction in mechanical performance compared with solid electrolytes based on the same composite system. The technique can use conventional composites materials and fabrication routes.

Two carbon fibre skins were fabricated from 3 layers of 200 gsm plain weave carbon fibre fabric. This was laid up wet using Struer's resin and cured under vacuum overnight at room temperature followed by a post cure at 60° C. for ~1 hour. Two sections of cured CFRP material ~60×60 mm were cut out to form the capacitor's two electrodes and the inside faces were rubbed back to expose the bare fibres. Two of the prepared CFRP electrodes were then bonded either side of a single layer of plain weave 200 gsm E-glass fabric using viscosity modified epoxy. The bond pattern was a simple 5 mm border in order to create a ~50×50 mm non-infiltrated area. The controlled areas of non-infiltrated fabric were then infiltrated with a liquid electrolyte to create an EDLC structure. Due to their significantly higher ion mobility the use of liquid electrolytes enables large increases in the practically useful capacitance of these devices (lower internal resistance) as compared to those based on solid polymer electrolytes. For these tests the electrolyte was a 5.5 M aqueous solution of potassium hydroxide but the devices could also use organic electrolytes without further modification if required as this would allow the working voltage to be increased.

Example 3

A second liquid filled device was prepared in a similar manner to that in example 2, but with a simple modification to provide increased capacitance. Layers of plain weave carbon fibre fabric were added either side of the glass fibre separator. These fabrics were electrically connected to the rubbed back CFRP skins but contained ~50×50 mm non-infiltrated sections which it was expected would provide a large increase in effective electrode surface area.

Capacitance Tests

Tests were performed using the constant current discharge method. Each capacitor was charged to its working voltage (2.5V for the solid polymer electrolyte devices and 1.0V for the aqueous electrolyte devices) Capacitance was derived as C=I (dt/dV), where dV was the voltage range (Vr*0.9)–(Vr*0.7) and dT was the elapsed time for this change in voltage.

TABLE 5 comparison of solid polymer electrolyte (SPE) and liquid polymer electrolyte supercapacitor (Aq)

| Example | Description | C (µF) Cl method | C (µF) DVM | Spec. cap. Cl (µF/cm³) | Spec. cap. DVM (µF/cm³) |
|---|---|---|---|---|---|
| 1 | SPE Plain CF | 0.062 | 120 | 0.008 | 17 |
| 2 | Aq. Plain CFRP | 257 | 280 | 64 | 70 |
| 3 | Aq. CF + Fabric | 13705 | 14600 | 2741 | 2920 |

The SPE devices have a much lower capacitance compared to the devices according to the invention.

Whilst the invention has been described above, it extends to any inventive combination of the features set out above, or in the following description, drawings or claims.

Exemplary embodiments of the component in accordance with the invention will now be described with reference to the accompanying drawings in which:—

Figure 2A:
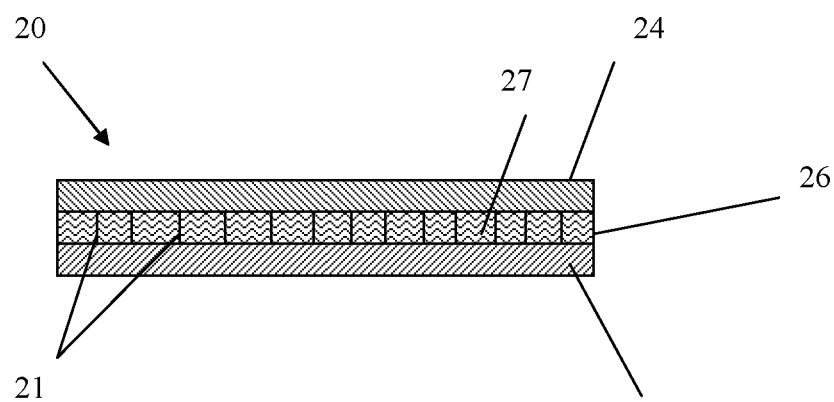
Figure 2B:
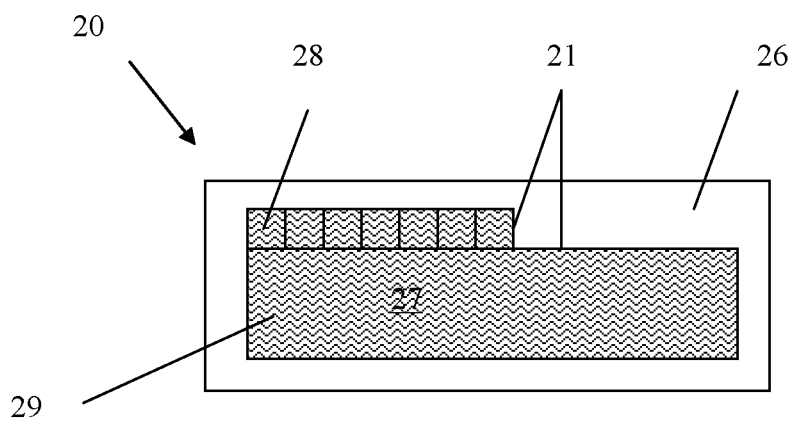

FIG. 1 shows a cross sectional side view of a component integral with a supercapacitor, according to the invention, and FIGS. 2a and 2b shows a partially bonded separator structure to encapsulate a liquid electrolyte.

The invention provides components comprising a structural supercapacitor using formed at least in part from composite materials, thereby imparting desired structural properties. FIG. 1 shows an example of a component integral with supercapacitor of the invention, depicted generally at 10, comprising a first electrode structure 12 which is spaced apart from a second electrode structure 14 by a separator structure 16. The first and second electrode structures 12, 14 may be connected to suitable electrode contacts 18, 20 to permit charging and discharging of the supercapacitor in the usual manner, although, as explained in more detail below, the first and second electrode structures 12, 14 may act fully as current collectors.

Each of the first and second electrode structures 12, 14 and the separator structure 16 are formed as a composite material comprising suitable fibres in a binder matrix. The first and second electrode structures 12, 14 may optionally comprise electrically conductive fibres 12a, 14a in respective binder matrices 12b, 14b. The separator structure 16 comprises electrically insulating fibres 16a in a binder matrix 16b. The fluidic electrolyte 17 is located within the supercapacitor 10, in a void within the separator structure 16.

The fluidic electrolyte can be accommodated in a number of ways. The separator structure may be partially bonded in order to provide spaces which can be filled by the electrolyte. The electrolyte is retained by capillary action between fibres. A 30 to 40% degree of bonding is suitable for this purpose. A porous additive, such as a silica or a silica gel, may be used to provide a more open cell structure or a microporous polymer film may be employed. Vents may be provided to control the release of gases during overcharge conditions and fill/drain ports may be fitted to permit the introduction and removal of the aqueous electrolyte for maintenance or storage.

The component of the invention can be manufactured in different ways. For example, it is possible to fully manufacture each of the first and second electrode structures and the separator structure separately and subsequently bond these completed structures together. Alternatively, each structure may be produced separately, but with partial cure of the binder matrices, so that the structures can be co-cured together. The entire structure of the first and second electrodes and separator structures may be formed with a common binder matrix, for example in a wet lay up process, to provide a 'monolithic' structure for the component.

Other electrolyte systems may be used. For example, a porous separator structure may be produced by using an open cell foam. A gel electrolyte may be produced by adding gelling agents to an aqueous electrolyte solution.

The first and second electrodes and separator structures are not necessarily planar. Non-planar configurations may be employed, for example, to provide a curved or even a generally tubular structure. The composite structures of the invention are well suited for such configurations. The device may comprise a number of electrodes and may be formed with integral electrochemical cells.

FIG. 2a shows a capacitor structure 20, with a first electrode structure 24 and second electrode structure 22, as described in FIG. 1. The electrodes sandwich a partially bonded separator structure 26, the layer has a plurality bonding site 21 which enables the adhesion of the separator structure 26 and first and second electrode structures 22, 26. The open bonding sites 21 will create open cavities which can be filled with a fluidic electrolyte 27.

FIG. 2b shows a plan view of the partially bonded separator structure 26, where the bonding sites 21, may define small cavities 28 or a larger cavity 29, which are then capable in the final device of being filled with liquid electrolyte 27. The balance of strength of the composite structure and capacitance will determined the degree of bonding required in the partially bonded separator structure 26 and the volume of fluidic electrolyte.

The invention claimed is:

1. A component comprising a structural supercapacitor included in said component, the structural supercapacitor including:
   a first electrode structure;
   a second electrode structure; and
   a separator structure;
   said separator structure being formed from a composite material comprising a glass fibre ply in a cured electrically insulating separator binder matrix;
   said separator structure separating the first electrode structure from the second electrode structure;
   said separator structure further comprising at least one void which comprises a fluidic electrolyte;
   each of the first electrode structure and the second electrode structure comprising at least one ply of conductive composite material which includes electrically conductive fibres in a cured, electrically insulating electrode binder matrix; and
   the supercapacitor being structurally inseparable from a remainder of the component.

2. The component according to claim 1, wherein said at least one void is formed from interstices of a separator structure that is partially bonded to the first electrode structure or the second electrode structure.

3. The component according to claim 1, wherein at least one of the first electrode structure, the second electrode structure, and the separator structure comprises a porous additive which increases access of the electrolyte into said structure.

4. The component according to claim 1, wherein at least one of the first electrode structure and the second electrode structure further includes an electrically conductive additive.

5. The component according to claim 1, wherein:
   the electrically insulating binder matrix is a polymer, ceramic, or glass.

6. The component according to claim 1, wherein at least one of the first electrode and the second electrode comprises and is electrically connected to a further at least one electrically conductive fibre ply.

7. The component according to claim 6, wherein at least one of the electrically conductive fibre plies is a carbon fibre ply.

8. The component according to claim 1, wherein the separator structure comprises a microporous polymer film.

9. The component according to claim 1, wherein the separator structure includes an electrically insulating binder matrix material that is a viscosity modified curable resin.

10. The component of claim 1, wherein the separator binder matrix and the electrode binder matrix form a common binder matrix.

11. A panel on a vehicle, vessel, or craft comprising at least one component, said component including a structural supercapacitor including:
   a first electrode structure;
   a second electrode structure; and
   a separator structure;

said separator structure being formed from a composite material comprising a glass fibre ply in a cured electrically insulating separator binder matrix;

said separator structure separating the first electrode structure from the second electrode structure;

said separator structure further comprising at least one void which comprises a fluidic electrolyte;

each of the first electrode structure and the second electrode structure comprising at least one ply of conductive composite material which includes electrically conductive fibres in a cured, electrically insulating electrode binder matrix; and the supercapacitor being structurally inseparable from the rest of the component.

12. The panel of claim 11, wherein the separator binder matrix and the electrode binder matrix form a common binder matrix.

13. A method of manufacturing a component including, and being structurally inseparable from, a supercapacitor, the method comprising:

providing a separator structure comprising fibrous reinforcing material and plastic matrix material;

laying up, on either side of the separator structure, a layup of plies of electrically conductive fibrous reinforcing material;

introducing an electrode binder matrix into said plies, thereby forming first and second electrodes that are separated from each other by the separator structure; and consolidating and curing the first electrode, second electrode and separator structure into a single composite component;

said separator structure, after curing, further comprising at least one void that is able to accommodate a liquid electrolyte.

14. The method according to claim 13, further comprising inserting a liquid or gel electrolyte into said at least one void.

15. The method of claim 13, wherein curing the first electrode, second electrode and separator structure into a single composite component includes forming a common binder matrix from the plastic binder material and the electrode binder matrix.

* * * * *